United States Patent
Tai et al.

(10) Patent No.: US 8,962,129 B2
(45) Date of Patent: Feb. 24, 2015

(54) RUBBER-REINFORCING MEMBER AND RUBBER PRODUCT UTILIZING THE SAME

(75) Inventors: Nobuaki Tai, Tokyo (JP); Mitsuharu Akiyama, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 795 days.

(21) Appl. No.: 12/600,044

(22) PCT Filed: May 22, 2008

(86) PCT No.: PCT/JP2008/059460
§ 371 (c)(1),
(2), (4) Date: Nov. 13, 2009

(87) PCT Pub. No.: WO2008/146708
PCT Pub. Date: Dec. 4, 2008

(65) Prior Publication Data
US 2010/0221520 A1    Sep. 2, 2010

(30) Foreign Application Priority Data
May 25, 2007    (JP) ................................. 2007-139106

(51) Int. Cl.
B32B 25/02    (2006.01)
D06M 15/333    (2006.01)
(Continued)

(52) U.S. Cl.
CPC ................ *D06M 15/333* (2013.01); *C08J 5/06* (2013.01); *D06M 11/73* (2013.01); *D06M 11/77* (2013.01); *D06M 15/39* (2013.01); *F16G 1/28* (2013.01); *F16G 5/20* (2013.01)
USPC ........ 428/296.4; 428/500; 428/375; 428/383; 428/390; 428/391; 156/307.5; 442/181; 152/451

(58) Field of Classification Search
USPC .............. 428/500, 375, 383, 390, 391, 296.4; 156/307.5; 442/181; 152/451
See application file for complete search history.

(56) References Cited

U.S. PATENT DOCUMENTS

| | | |
|---|---|---|
| 5,484,341 A | 1/1996 | Fujiwara et al. |
| 5,609,541 A | 3/1997 | Tachibana et al. |

(Continued)

FOREIGN PATENT DOCUMENTS

| | | | |
|---|---|---|---|
| EP | 1541617 A1 | * | 6/2005 |
| EP | 1 842 958 A1 | | 10/2007 |

(Continued)

*Primary Examiner* — Peter Y Choi
*Assistant Examiner* — Vincent A Tatesure
(74) *Attorney, Agent, or Firm* — Hamre, Schumann, Mueller & Larson, P.C.

(57) ABSTRACT

A rubber-reinforcing cord (12) as a rubber-reinforcing member of the present invention is a rubber-reinforcing member for reinforcing a rubber product (such as a toothed belt (1)). The rubber-reinforcing cord (12) includes a reinforcing fiber or a reinforcing fiber sheet, and a first coating film provided on a surface of the reinforcing fiber or a surface of the reinforcing fiber sheet. The first coating film is formed by applying a first treatment agent containing polyvinyl alcohol and a crosslinking agent to the reinforcing fiber or the reinforcing fiber sheet and drying the first treatment agent. In the reinforcing member of the present invention, a second coating film as a primary coating film may be provided on the surface of the reinforcing fiber or the surface of the reinforcing fiber sheet. The second coating film can be produced using a second treatment agent containing a rubber latex, for example.

8 Claims, 2 Drawing Sheets

(51) Int. Cl.
*C08J 5/06* (2006.01)
*D06M 11/73* (2006.01)
*D06M 11/77* (2006.01)
*D06M 15/39* (2006.01)
*F16G 1/28* (2006.01)
*F16G 5/20* (2006.01)

(56) References Cited

U.S. PATENT DOCUMENTS

| | | | | |
|---|---|---|---|---|
| 6,106,943 | A * | 8/2000 | Akiyama | 428/375 |
| 6,262,154 | B1 * | 7/2001 | Okamura et al. | 524/100 |
| 2004/0024126 | A1 * | 2/2004 | Tsou et al. | 525/178 |
| 2005/0129943 | A1 * | 6/2005 | Ando | 428/375 |
| 2005/0143521 | A1 * | 6/2005 | Kawaguchi et al. | 525/154 |
| 2006/0063884 | A1 | 3/2006 | Akiyama | |
| 2008/0121327 | A1 * | 5/2008 | Matsumura et al. | 152/451 |
| 2008/0166576 | A1 * | 7/2008 | Akiyama et al. | 428/500 |

FOREIGN PATENT DOCUMENTS

| | | |
|---|---|---|
| EP | 1842958 A1 * | 10/2007 |
| JP | 1-272876 A | 10/1989 |
| JP | 3-269177 A | 11/1991 |
| JP | 7-217705 A | 8/1995 |
| JP | 7-259928 A | 10/1995 |
| JP | 8-113657 A | 5/1996 |
| JP | 2004-183121 A | 7/2004 |
| JP | 2004-203730 A | 7/2004 |
| JP | 2007-070169 A | 3/2007 |
| SU | 537152 | 12/1976 |
| SU | 852981 | 9/1981 |
| WO | WO 2006/078013 A1 | 7/2006 |

* cited by examiner

RUBBER-REINFORCING MEMBER AND RUBBER PRODUCT UTILIZING THE SAME

TECHNICAL FIELD

The present invention relates to a rubber-reinforcing member for reinforcing rubber products and a rubber product including the rubber-reinforcing member.

BACKGROUND ART

Toothed belts used for driving a camshaft of an internal-combustion engine of an automobile are required to have high dimensional stability to keep suitable timing. Furthermore, rubber belts used for, for example, driving an injection pump, etc. and transmitting power in industrial machines are required to have strength and elasticity that allow the rubber belts to withstand a heavy load and severe bending. In order to fulfill these requirements, a rubber-reinforcing cord including a reinforcing fiber is embedded in the matrix rubbers for these rubber products in some cases. Also, as a means for reinforcing the toothed belt, a rubber-reinforcing sheet including a reinforcing fiber sheet is used in addition to the rubber-reinforcing cord in some cases.

On the other hand, belts made of chloroprene rubber conventionally have been used for industrial applications, such as office automation apparatuses. With the dioxin issue having been discussed in recent years, use of the chloroprene rubber has been shifted positively to use of ethylene-α-olefin rubber, such as ethylene-propylene rubber (EPR) and ethylene-propylene-diene monomer copolymer rubber (EPDM), that is free from halogen. However, the ethylene-α-olefin rubber has low adhesion particularly to fibers used as a reinforcing material for rubbers. This tends to cause a problem such that the fiber is separated easily from the rubber while being used.

In order to enhance the adhesion between the matrix rubber and the reinforcing fiber, and furthermore, in order to prevent deterioration of the quality of the reinforcing fiber, a coating film to be provided on a surface of the reinforcing fiber has been studied.

For example, JP 8 (1996)-113657 A discloses a rubber-reinforcing cord on which a coating film is formed by applying a treatment agent obtained by mixing a resorcin-formaldehyde condensate and a styrene-butadiene-vinylpyridine latex to a reinforcing fiber.

On the other hand, from the viewpoint that use of a large amount of resorcin-formaldehyde condensate and ammonia increases an environmental burden and necessitates environmental measures to be taken particularly for workers, JP 1(1989)-272876 A discloses a rubber-reinforcing cord on which a rubber layer free from a thermosetting resin component, such as a resorcin-formaldehyde condensate, is formed as a coating film by treating a reinforcing fiber only with a rubber latex.

JP 2004-183121 A proposes a rubber-reinforcing cord on which a coating film is formed using an aqueous adhesive containing a hydrogenated nitrile rubber latex and a maleimide crosslinking agent, as a rubber-reinforcing cord having satisfactory adhesion to a predetermined rubber, a high heat resistance, and a high bending fatigue resistance.

JP 7 (1995)-217705 A discloses, as a tooth cloth constituting a toothed belt, a tooth cloth (a rubber-reinforcing sheet) that is treated with a solution obtained by mixing a resorcin-formaldehyde condensate and a latex and then is impregnated with a rubber cement containing a filler such as carbon. In addition, JP 7 (1995)-259928 A discloses a tooth cloth treated with a rubber composition obtained by mixing a hydrogenated nitrile rubber and N,N'-m-phenylenedimaleimide.

However, it is difficult even for the rubber-reinforcing cord described in JP 8 (1996)-113657 A to obtain an adhesive strength sufficient to meet the current demands. Also, the rubber-reinforcing cord described in JP 8 (1996)-113657 A causes a heavy environmental burden due to a large amount of resorcin-formaldehyde condensate with which the reinforcing fiber is treated.

The rubber-reinforcing cords disclosed in JP 1(1989)-272876 A and JP 2004-183121 A use neither a resorcin-formaldehyde condensate nor ammonia. In some cases, however, they cannot have satisfactory adhesion to rubber depending on the type of the rubber used, for example, ethylene-α-olefin rubber with a light environmental burden.

The rubber-reinforcing sheets described in JP 7 (1995)-217705 A and JP 7 (1995)-259928 A cannot have satisfactory adhesion to rubber in some cases depending on the type of the rubber used, for example, ethylene-α-olefin rubber with a light environmental burden.

Treatment agents for glass fibers also have been proposed. For example, JP 2007-70169 A discloses a glass fiber binder containing a polymer obtained by graft polymerization of vinyl pyrrolidone onto polyvinyl alcohol, as a binder for enhancing the binding of the glass fibers. JP 2004-203730 A discloses a glass fiber coating solution containing an acrylic acid ester resin, a styrene-butadiene-vinylpyridine copolymer, and a resorcin-formaldehyde condensate resin, as a glass fiber coating solution used for forming a coating layer for a rubber-reinforcing glass fiber. The acrylic acid ester resin contained in this coating solution is an acrylic acid ester emulsion obtained by adding polyvinyl alcohol or modified polyvinyl alcohol to an acrylic monomer as a water-soluble colloid, and then emulsion-polymerizing it. However, even when a reinforcing cord is formed using a glass fiber that has been treated with any of these treatment agents, satisfactory adhesion to rubber cannot be obtained in some cases depending on the type of the rubber used.

DISCLOSURE OF THE INVENTION

The present invention is intended to provide a rubber-reinforcing member, such as a rubber-reinforcing cord and a rubber-reinforcing sheet, that has satisfactory adhesion to rubber and causes a light environmental burden in the process of forming a coating film therein. The present invention also is intended to provide a rubber product including the rubber-reinforcing member.

The rubber-reinforcing member of the present invention is a rubber-reinforcing member for reinforcing a rubber product, and includes a reinforcing fiber or a reinforcing fiber sheet, and a first coating film provided on a surface of the reinforcing fiber or a surface of the reinforcing fiber sheet. The first coating film is formed by applying an aqueous first treatment agent to the reinforcing fiber or the reinforcing fiber sheet and drying the first treatment agent. The first treatment agent contains polyvinyl alcohol and a crosslinking agent as essential components, and a resorcin-formaldehyde condensate as an optional component. A content of the resorcin-formaldehyde condensate in the first treatment agent is 0 to 40 parts by mass (preferably 0 to 2 parts by mass) with respect to 10 parts by mass of the polyvinyl alcohol, in terms of mass ratio of solid content. More preferably, the first treatment agent is free from the resorcin-formaldehyde condensate. In this specification, the term "solid content" is a general term for describing a residue (a substance) other than a solvent or a dispersion medium. The mass ratio of solid content means a mass ratio among solid contents of constituent components.

The rubber product of the present invention is a rubber product including the rubber-reinforcing member of the present invention.

The rubber-reinforcing member of the present invention can enhance more significantly the adhesion to a matrix rubber with excellent bending fatigue resistance and heat resistance than conventional rubber-reinforcing members such as rubber-reinforcing cords and rubber-reinforcing sheets. The first treatment agent used in the present invention is free from a substance, such as an organic solvent, formaldehyde, and ammonia, that causes a heavy environmental burden, or the amount of the substance is small if it is contained therein. Thus, the working environment in which the coating film is formed can be improved. Furthermore, the rubber product of the present invention can satisfy the high heat resistance and bending fatigue resistance required by timing belts, etc.

BEST MODE FOR CARRYING OUT THE INVENTION

Figure 1:
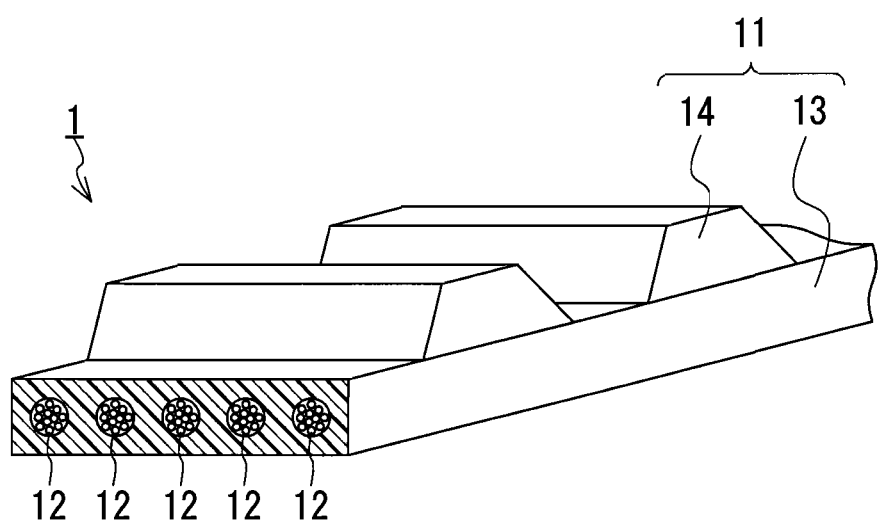
FIG. 1 is a partially cross-sectional perspective view showing an example of a rubber product including the rubber-reinforcing member of the present invention.

Hereinafter, embodiments of the present invention will be described in detail.

As the rubber-reinforcing member of the present invention, a rubber-reinforcing cord and a rubber-reinforcing sheet can be mentioned, for example. The rubber-reinforcing cord as an example of the rubber-reinforcing member of the present invention includes a reinforcing fiber and a first coating film provided on a surface of the reinforcing fiber. The first coating film is a film formed by applying an aqueous first treatment agent to the reinforcing fiber, and drying the first treatment agent. The length of the rubber-reinforcing cord is not particularly limited. It may be tens of thousands of meters, or may be cut into a length such as several millimeters, hundreds of micrometers, and tens of micrometers. The rubber-reinforcing sheet as another example of the rubber-reinforcing member of the present invention includes a reinforcing fiber sheet and a first coating film provided on the surface of the reinforcing fiber sheet. The first coating film in this case is a film formed by applying the aqueous first treatment agent to the reinforcing fiber sheet, and drying the first treatment agent.

First, the reinforcing fiber and the reinforcing fiber sheet used in the present embodiment will be described.

The shape and material for the reinforcing fiber used in the present embodiment are not particularly limited as long as the reinforcing fiber enhances the shape stability and strength of a rubber product when embedded in the matrix rubber of the rubber product. Examples of the reinforcing fiber include a glass fiber, a polyvinyl alcohol fiber represented by a vinylon fiber, a polyester fiber, a polyamide fiber such as a nylon fiber and an aramid (aromatic polyamide) fiber, a carbon fiber, and a polyparaphenylene benzoxazole fiber. Among these examples, the glass fiber preferably is used because it excels in properties such as heat resistance and tensile strength. The form of the reinforcing fiber is not particularly limited as long as it allows the reinforcing fiber to be embedded in the matrix rubber. Specific examples thereof includes forms of staple, filament, cord, and rope.

The reinforcing fiber sheet used in the present embodiment is a sheet made of reinforcing fiber. The reinforcing fiber is not particularly limited as long as it enhances the shape stability and strength of the reinforcing fiber sheet. Examples of the reinforcing fiber include a glass fibers, a polyvinyl alcohol fiber represented by a vinylon fiber, a polyester fiber, a polyamide fiber such as a nylon fiber and an aramid (aromatic polyamide) fiber, a carbon fibers, and a polyparaphenylene benzoxazole fiber. A preferable example of the reinforcing fiber sheet is a reinforcing fiber sheet obtained by weaving nylon fibers into a sheet. One of the above-mentioned fibers may be used, or more than one of them may be used in combination. The shape of the reinforcing fiber sheet is not particularly limited as long as it is a sheet-like shape. The reinforcing fiber sheet may be a woven fabric or a nonwoven fabric.

Next, a detailed description will be made with respect to the aqueous first treatment agent used for forming the first coating film on the surface of the reinforcing fiber or that of the reinforcing fiber sheet.

The first treatment agent used for the rubber-reinforcing member of the present embodiment contains polyvinyl alcohol and a crosslinking agent.

Examples of the crosslinking agent contained in the first treatment agent include a quinonedioxime crosslinking agent such as P-quinonedioxime, a methacrylate crosslinking agent such as lauryl methacrylate and methylmetaacrylate, an allyl crosslinking agent such as DAF (diallyl fumarate), DAP (diallyl phthalate), TAC (triallyl cyanurate), and TAIC (triallyl isocyanurate), a maleimide crosslinking agent such as bismaleimide, phenylmaleimide, and N,N-m-phenylenedimaleimide, aromatic organic diisocyanate, aliphatic organic diisocyanate, polyisocyanate, an aromatic nitroso compound, and sulfur. One of these crosslinking agents may be used, or more than one of them may be used in combination. When the first treatment agent contains a rubber latex, a selection is made among these crosslinking agents taking into consideration the types of the rubber latex, the matrix rubber, etc. Preferably, the crosslinking agent is a water-dispersive material so as to be present uniformly in the first treatment agent.

Among the above-mentioned crosslinking agents, at least one selected from the maleimide crosslinking agent and the quinonedioxime crosslinking agent preferably is used. Of these crosslinking agents, the maleimide crosslinking agent preferably is used for reasons such as that the maleimide crosslinking agent allows a high adhesive strength to the matrix rubber to be obtained, and it is easy to use (for example, it has a high solubility to water). Particularly, diphenylmethane-4,4'-bismaleimide is used preferably because it has a high stability when dispersed in water and a high crosslinking effect, and also has a high heat resistance after the crosslinking. The maleimide crosslinking agent and the quinonedioxime crosslinking agent each can enhance specifically the adhesion between the rubber-reinforcing member and the matrix rubber, when combined with the polyvinyl alcohol.

When an excessively small amount of the crosslinking agent is contained in the first treatment agent, the crosslinking between the first coating film and the matrix rubber is insufficient, and they easily may be separated from each other at an interface therebetween. On the other hand, an excessively large amount of the crosslinking agent reduces the relative amount of the polyvinyl alcohol, lowering the strength of the first coating film. As a result, the adhesion between the rubber-reinforcing member and the matrix rubber easily may be insufficient. Thus, the content of the crosslinking agent in the first treatment agent preferably is 10 to 180 parts by mass, more preferably 25 to 120 parts by mass, and further preferably 30 to 80 parts by mass with respect to 10 parts by mass of the polyvinyl alcohol, in terms of mass ratio of solid content.

The resorcin-formaldehyde condensate may be contained in the first treatment agent used in the present embodiment, although it is not an essential component. When the resorcin-formaldehyde condensate is contained, the content of the resorcin-formaldehyde condensate in the first treatment agent is 0 to 40 parts by mass with respect to 10 parts by mass of the polyvinyl alcohol. The content of the resorcin-formaldehyde condensate exceeding 40 parts by mass is not preferable because it reduces the adhesion of the rubber-reinforcing member to rubber, contrary to what might be expected. In contrast, by limiting the content of the resorcin-formaldehyde condensate to 0 to 2 parts by mass, it is possible to produce the rubber-reinforcing member having high adhesion and a more suppressed influence on the environment and workers than before. Taking into consideration the influence on the environment and workers, it is desirable that the content of the resorcin-formaldehyde condensate is low. Preferably, it is 2 or less parts by mass in terms of mass ratio of solid content, and more preferably, the first treatment agent is free from the resorcin-formaldehyde condensate. The first treatment agent of the present embodiment may be free from the resorcin-formaldehyde condensate. This makes it unnecessary to use a substance with a heavy environmental burden, such as formaldehyde and ammonia, and makes it unnecessary to take the environmental measures, particularly for workers.

The first treatment agent further may contain a crosslinking accelerator. A zinc compound is preferable as the crosslinking accelerator, and examples thereof include zinc diethyl dithiocarbamate (ZDEC), zinc dimethyl dithiocarbamate (ZDMC), zinc dibutyl dithiocarbamate (ZDBC), zinc dibenzyl dithiocarbamate (ZBEC), zinc mercaptobenzothiazole (ZMBT), zinc diisononyl dithiocarbamate (ZID), and zinc phosphate. One of these crosslinking accelerators may be used, or more than one of them may be used in combination. A selection is made among these crosslinking accelerators taking into consideration the type of the rubber latex contained in the first treatment agent, the type of the matrix rubber, etc. Preferably, the crosslinking accelerator is a water-dispersive material so as to be present uniformly in the first treatment agent.

Among the above-mentioned crosslinking accelerators, the zinc phosphate and the zinc dimethyl dithiocarbamate are used preferably because of their high crosslinking effects. The zinc phosphate and the zinc dimethyl dithiocarbamate each can enhance specifically the adhesion between the rubber-reinforcing member and the matrix rubber when combined with the above-mentioned polyvinyl alcohol.

The content of the crosslinking accelerator in the first treatment agent preferably is 0 to 50 parts by mass, more preferably 0 to 40 parts by mass, and further preferably 0 to 25 parts by mass with respect to 10 parts by mass of the polyvinyl alcohol, in terms of mass ratio of solid content.

Preferably, a mass ratio among the polyvinyl alcohol, the crosslinking agent, and the crosslinking accelerator in the first treatment agent is polyvinyl alcohol:crosslinking agent:crosslinking accelerator=10:30 to 80:0 to 25. The first treatment agent satisfying this mass ratio makes it possible to obtain the rubber-reinforcing member with enhanced adhesion to the matrix rubber.

Carbon black may be contained in the first coating film as a component. More specifically, the first treatment agent further may contain carbon black. Adding the carbon black can suppress the production cost of the rubber-reinforcing member and enhance effectively the adhesion of the rubber-reinforcing member to the matrix rubber. The content of the carbon black in the first treatment agent preferably is 0 to 80 parts by mass, more preferably 0 to 50 parts by mass, and further preferably 0 to 30 parts by mass with respect to 10 parts by mass of the polyvinyl alcohol. Preferably, the carbon black is a water-dispersive material so as to be present uniformly in the first treatment agent.

Silica particles may be contained in the first coating film as a component. More specifically, the first treatment agent further may contain silica particles. Adding the silica particles can suppress the production cost of the rubber-reinforcing member and enhance effectively the adhesion of the rubber-reinforcing member to the matrix rubber. The content of the silica particles in the first treatment agent preferably is 0 to 80 parts by mass, more preferably 0 to 50 parts by mass, and further preferably 0 to 30 parts by mass with respect to 10 parts by mass of the polyvinyl alcohol. Preferably, the silica particles are a water-dispersive material so as to be present uniformly in the first treatment agent.

The first treatment agent further may contain a rubber latex, such as a carboxyl-modified hydrogenated nitrile rubber latex, a carboxyl-modified nitrile rubber latex, a butadiene-styrene copolymer latex, a dicarboxylated butadiene-styrene copolymer latex, a styrene-butadiene-vinylpyridine copolymer latex, a chloroprene latex, a butadiene latex, a chlorosulfonated polyethylene latex, and an acrylonitrile-butadiene copolymer latex. Several of these latexes may be blended to be used as the rubber latex.

Peroxide may be contained in the first coating film as a component. More specifically, the first treatment agent further may contain peroxide. Adding the peroxide accelerates the crosslinking between the first coating film and the matrix rubber, making it possible to enhance further the adhesion between the rubber-reinforcing member and the matrix rubber. The type of the peroxide to be used is not particularly limited, and organic peroxide, such as hydroperoxide and dialkylperoxide, can be used. As the peroxide to be used in the present embodiment, however, it is necessary to select peroxide with a reaction rate equivalent to that of the crosslinking agent contained in the matrix rubber. Among these peroxides, water-insoluble ones preferably are water-dispersive materials so as to be present uniformly in the first treatment agent. Among various peroxides, cumen hydroperoxide used in the after-mentioned examples is preferable because it has excellent adhesion and is easy to handle because of its water-solubility. The content of the peroxide in the first treatment agent preferably is 0 to 30 parts by mass, and more preferably 0 to 20 parts by mass with respect to 10 parts by mass of the polyvinyl alcohol.

In the first treatment agent, the above-mentioned components, such as the polyvinyl alcohol, the crosslinking agent, and the resorcin-formaldehyde condensate, are dispersed or dissolved in an aqueous solvent. As the aqueous solvent, a water solvent preferably is used because it is easy to handle, makes it easy to control the components, and has much lighter environmental burden than those of organic solvents. The aqueous solvent may contain lower alcohol, etc.

The first treatment agent may contain other components, such as an inorganic filler, a plasticizer, antioxidant, and metal oxide, other than the carbon black and the silica particles.

The method for forming the first coating film by applying the first treatment agent to the reinforcing fiber is not particularly limited in producing the rubber-reinforcing cord as the rubber-reinforcing member. Generally, the reinforcing fiber is immersed in the first treatment agent contained in a water tank, taken out from the tank, and then placed in a drying furnace so that the solvent is removed from the reinforcing fiber. The drying conditions for removing the solvent are not particularly limited. For example, the solvent can be removed by being exposed to an atmosphere at 80° C. to 160° C. for 0.1 to 2 minutes. A predetermined number of the reinforcing fibers with the first coating film thus formed thereon are collected and twisted to form the rubber-reinforcing cord. The number of twists may be set as appropriate according to the fiber to be used. The twisting may be performed in more than one step according to the size and specifications of the rubber-reinforcing cord needed, and moreover, the twisting direction is not particularly limited. When the twisting is performed in two steps, sub-cords are produced first by primarily twisting several of the reinforcing fibers, and then several of the sub-cords are bundled and finally twisted to form the rubber-reinforcing cord.

The reinforcing fiber with a second coating film formed on a surface thereof as a primary coating film (the reinforcing fiber with a primary coating film) may be used. The second coating film can be formed by applying a second treatment agent containing the rubber latex to the reinforcing fiber and drying the second treatment agent. The second treatment agent further may contain the resorcin-formaldehyde condensate. In such a configuration, the first coating film is provided on the second coating film (on a surface of the reinforcing fiber with the primary coating film). It also is possible to produce the rubber-reinforcing cord as follows, for example. The second coating film is formed on the surface of the reinforcing fiber by applying the second treatment agent containing the rubber latex and the resorcin-formaldehyde condensate to the reinforcing fiber and drying the second treatment agent, and then the first coating film is formed thereon by applying the first treatment agent of the present embodiment to the second coating film and drying the first treatment agent. When the two films (the second coating film serving as the primary coating film and the first coating film formed on the second coating film) are formed on the surface of the reinforcing fiber, the rubber-reinforcing cord may be produced, for example, by producing a cord by collecting a predetermined number of the reinforcing fibers with the second coating film formed thereon and twisting the reinforcing fibers, and then forming the first coating film thereon by applying the first treatment agent to a surface of the cord and drying the first treatment agent. The second treatment agent may be composed of only the rubber latex without containing the resorcin-formaldehyde condensate.

In the rubber-reinforcing member of the present embodiment, which is the rubber-reinforcing cord or the rubber-reinforcing sheet, the first coating film has preferably an adhesion rate of 1.5 to 30 mass %, and more preferably an adhesion rate of 2 to 22 mass %. The adhesion rate of less than 1.5 mass % makes it difficult for the first coating film to coat the entire surface of the reinforcing fiber or that of the reinforcing fiber sheet. On the other hand, the adhesion rate exceeding 30 mass % causes a problem that the first treatment agent drips during the formation of the first coating film. In this specification, the adhesion rate (R1) of the first coating film is the mass percentage of the first coating film that remains adhered to the reinforcing fiber such as the glass fiber. The adhesion rate R1 is given by the following formula.

$$R1(\%) = ((C1 - C0)/C1) \times 100,$$

where C0 is the dry mass of the reinforcing fiber before coating, and C1 is the dry mass of the rubber-reinforcing cord after coating.

Next, the rubber product of the present invention will be described.

The rubber product of the present invention includes the rubber-reinforcing member described above. When the rubber-reinforcing cord is used as the rubber-reinforcing member, the rubber-reinforcing cord is embedded in a rubber composition (matrix rubber). As an example of the rubber product of the present invention, a toothed belt as shown in FIG. 1 can be mentioned, for example. A toothed belt 1 shown in FIG. 1 includes a belt main body 11 and a rubber-reinforcing cord 12. The belt main body 11 includes a belt portion 13, and a plurality of tooth portions 14 projecting from the belt portion 13 at a constant interval. The rubber-reinforcing cord 12 is embedded in the belt portion 13 and extends in a circumferential direction (longitudinal direction) of the belt portion 13. As the rubber-reinforcing cord 12, the rubber-reinforcing cord of the present embodiment described above is used.

In producing the rubber product of the present invention, the method for embedding the rubber-reinforcing cord into the matrix rubber is not particularly limited and a known method can be used. The rubber product thus obtained has all the high heat resistance derived from the characteristics of the matrix rubber, high strength obtained by embedding the rubber-reinforcing cord, and the high bending fatigue resistance. Accordingly, the rubber product is suitable particularly for applications such as a timing belt for vehicle engines.

Figure 2:
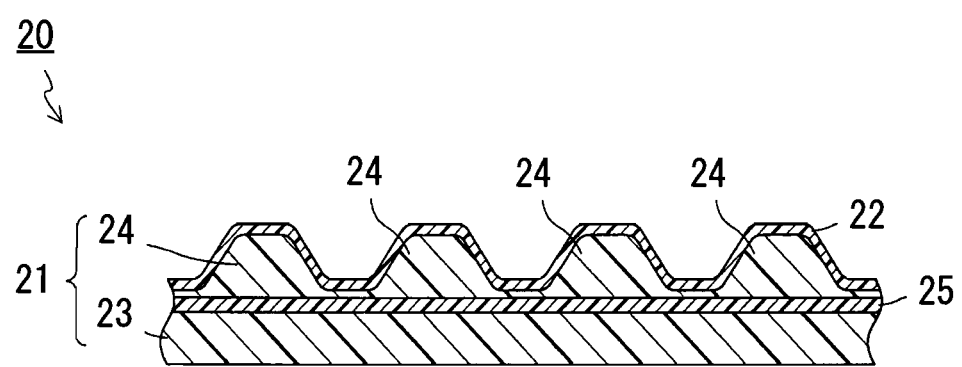
FIG. 2 is a cross-sectional view showing another example of the rubber product including the rubber-reinforcing member of the present invention.

The rubber product of the present invention may include the rubber-reinforcing sheet of the present embodiment described above. As an example of the rubber product including the rubber-reinforcing sheet, a toothed belt as shown in FIG. 2 can be mentioned, for example. A toothed belt 20 shown in FIG. 2 includes a belt main body 21 and a rubber-reinforcing sheet 22. The belt main body 21 includes a belt portion 23, and a plurality of tooth portions 24 projecting from the belt portion 23 at a constant interval. The reinforcing fiber sheet 22 is formed so as to cover a surface of the belt main body 21 on a side of the tooth portions 24. A rubber-reinforcing cord 25 is embedded in the belt portion 23. As the rubber-reinforcing cord 25, a strand coated with a coating film containing rubber can be used, for example. The strand is composed of reinforcing fiber, such as glass fiber and resin fiber. It also is possible to use the rubber-reinforcing cord of the present invention described above as the rubber-reinforcing cord 25.

The rubber to be used for the rubber product of the present invention is not particularly limited, and there can be used, for example, chloroprene rubber, chlorosulfonated polyethylene rubber, ethylene-α-olefin rubber, hydrogenated nitrile rubber, carboxyl-modified hydrogenated nitrile rubber, isoprene rubber, butadiene rubber, styrene butadiene rubber, nitrile rubber, butyl rubber, acrylic rubber, epichlorohydrin rubber, polysulfide rubber, silicone rubber, fluororubber, and polyurethane rubber. Among these rubbers, the ethylene-α-olefin rubber preferably is used. As a composition containing this rubber, there can be mentioned a composition obtained by adding zinc oxide, stearic acid, carbon black, silica, paraffin oil, dicumyl peroxide, sulfur, dibenzothiazyl sulfide, tetramethylthiuramdisulfide, zinc diethyldithiocarbamate, N-oxydiethylene-2-benzothiazyl sulfenamide, 2,2,4-trimethyl-1,2-dihydroquinoline, 2-mercaptobenzimidazole, a tackifier (petroleum resin), or the like to ethylene-propylene-diene copolymer rubber.

EXAMPLE

Hereinafter, the present invention will be described in further detail using examples.

Examples 1 to 16

Three glass fibers (each being a bundle of 200 filaments having an average diameter of 9 μm, E-glass composition) were aligned with one another to obtain a reinforcing fiber of 101 tex. The reinforcing fibers thus obtained were immersed in the first treatment agents of Examples 1 to 16, respectively, each of which had the composition shown in the following tables 1 and 2. Then, the reinforcing fibers were dried in a drying furnace set at 150° C. for 1 minute to form the first coating film thereon. Each of the reinforcing fibers with the first coating film was primarily twisted at a rate of 8 times/10 cm, and 11 of the primarily twisted reinforcing fibers were aligned and finally twisted at a rate of 8 times/10 cm to produce the rubber-reinforcing cords of Examples 1 to 16. The first coating films of the rubber-reinforcing cords of the Examples 1 to 16 all had an adhesion rate of 20 mass %.

Examples 17 to 32

First, the cords were prepared under the same conditions as in the Examples 1 to 16, except that the second treatment agent containing the resorcin-formaldehyde condensate and the rubber latex was used instead of the first treatment agents shown in Tables 1 and 2 (here, the second treatment agent was one obtained by mixing the resorcin-formaldehyde condensate, the styrene-butadiene-vinylpyridine latex, and a carboxyl-modified styrene-butadiene rubber latex so as to satisfy a mass ratio of resorcin-formaldehyde condensate:styrene-butadiene-vinylpyridine latex:carboxyl-modified denaturation styrene-butadiene rubber latex=9:70:30). Subsequently, the first treatment agents of the Examples 1 to 16 were applied to a surface of each of these cords, respectively, and then dried in the drying furnace set at 150° C. for 1 minute to form the first coating films Thus, the rubber-reinforcing cords of Examples 17 to 32 using the first treatment agents corresponding to the first treatment agents used in the Examples 1 to 16, respectively, were produced. More specifically, the rubber-reinforcing cords of the Examples 17 to 32 each were produced by forming the second coating film on the surface of the reinforcing fiber as the primary coating film, and then forming the first coating film on the second coating film by using the first treatment agent. Tables 3 and 4 show the compositions of the first treatment agents used in the Examples 17 to 32. The first coating films of the rubber-reinforcing cords of the Examples 17 to 32 all had an adhesion rate of 4 mass %.

Examples 33 and 34

The first treatment agents shown in the Examples 7 and 9 each were applied to a sheet of woven nylon fibers, and dried at 120° C. for 1 minute to produce the rubber-reinforcing sheets of Examples 33 and 34. Table 5 shows the compositions of the first treatment agents used in the Examples 33 and 34. The first coating films of the rubber-reinforcing sheets of the Examples 33 and 34 both had an adhesion rate of 10 mass %.

Examples 35 and 36

First, the sheets were prepared under the same conditions as in the Examples 33 and 34, except that instead of the first treatment agents shown in the Examples 7 and 9, the second treatment agent containing the resorcin-formaldehyde condensate and the rubber latex was applied to a sheet of woven nylon fibers (here, the second treatment agent was one obtained by mixing the resorcin-formaldehyde condensate, the styrene-butadiene-vinylpyridine latex, and the carboxyl-modified styrene-butadiene rubber latex so as to satisfy a mass ratio of resorcin-formaldehyde condensate:styrene-butadiene-vinylpyridine latex:carboxyl-modified styrene-butadiene rubber latex=9:70:30). Subsequently, the first treatment agents of Examples 35 and 36 shown in Table 5 were applied to the sheets, respectively, and dried for 1 minute to produce the rubber-reinforcing sheets of the Examples 35 and 36. More specifically, the rubber-reinforcing sheets of the Examples 35 and 36 were produced by forming the second coating film on the surface of the reinforcing fiber sheet as the primary coating film, and then forming the first coating film on the second coating film by using the first treatment agent. The first coating films of the rubber-reinforcing sheets of the Examples 35 and 36 both had an adhesion rate of 4 mass %.

TABLE 1

| Components | | Mass ratio of solid content (parts by mass) | | | | | | | |
|---|---|---|---|---|---|---|---|---|---|
| | | Ex. 1 | Ex. 2 | Ex. 3 | Ex. 4 | Ex. 5 | Ex. 6 | Ex. 7 | Ex. 8 |
| Polyvinyl alcohol (*1) | | 10 | 10 | 10 | 10 | 10 | 10 | 10 | 10 |
| Carboxyl-modified hydrogenated nitrile rubber latex (*2) | | 10 | 10 | 10 | 10 | 10 | 10 | | 10 |
| Styrene-butadiene-vinylpyridine latex (*3) | | | | | | | | 10 | |
| Crosslinking agent | Diphenylmethan-4,4'-bismaleimide | 50 | 50 | 50 | 50 | 50 | 50 | 50 | 50 |
| | P-quinonedioxime | 10 | | | | | | | |
| Crosslinking accelerator | Zinc dimethyl dithiocarbamate | | 10 | | | | | 10 | |
| | Zinc phosphate | | | 10 | | | | | |
| Carbon black | | | | | | 5 | | | 5 |
| Silica particles | | | | | | | 10 | | |
| Peroxide (cumen hydroperoxide) | | | | | | | | | 2 |
| Adhesive strength [N/10 mm] | | 35 | 40 | 50 | 50 | 40 | 37 | 35 | 60 |

(*1) Gohsenol GL-05 (produced by Chukyo Yushi Co., Ltd.)
(*2) Zetpol Latex (produced by Zeon Corp.)
(*3) Pyratex (produced by Nippon A & L Inc.)

TABLE 2

| Components | | Mass ratio of solid content (parts by mass) | | | | | | | |
|---|---|---|---|---|---|---|---|---|---|
| | | Ex. 9 | Ex. 10 | Ex. 11 | Ex. 12 | Ex. 13 | Ex. 14 | Ex. 15 | Ex. 16 |
| Polyvinyl alcohol (*1) | | 10 | 10 | 10 | 10 | 10 | 10 | 10 | 10 |
| Carboxyl-modified hydrogenated nitrile rubber latex (*2) | | | | | | | 10 | 10 | 10 |
| Styrene-butadiene-vinylpyridine latex (*3) | | 10 | 10 | 10 | 10 | 10 | | | |
| Crosslinking agent | Diphenylmethane-4,4'-bismaleimide | 50 | 50 | 50 | 50 | 50 | 50 | 90 | 20 |
| | P-quinonedioxime | | 10 | | | | | | |
| Crosslinking accelerator | Zinc dimethyl dithiocarbamate | | | 10 | | | 30 | 10 | 10 |
| | Zinc phosphate | | | | 10 | | | | |
| Resorcin-formaldehyde condensate | | 2 | 2 | 2 | 2 | 3 | | | |
| Adhesive strength [N/10 mm] | | 37 | 45 | 55 | 55 | 30 | 45 | 45 | 45 |

(*1) Gohsenol GL-05 (produced by Chukyo Yushi Co., Ltd.)
(*2) Zetpol Latex (produced by Zeon Corp.)
(*3) Pyratex (produced by Nippon A & L Inc.)

TABLE 3

| Components | | Mass ratio of solid content (parts by mass) | | | | | | | |
|---|---|---|---|---|---|---|---|---|---|
| | | Ex. 17 | Ex. 18 | Ex. 19 | Ex. 20 | Ex. 21 | Ex. 22 | Ex. 23 | Ex. 24 |
| Polyvinyl alcohol (*1) | | 10 | 10 | 10 | 10 | 10 | 10 | 10 | 10 |
| Carboxyl-modified hydrogenated nitrile rubber latex (*2) | | 10 | 10 | 10 | 10 | 10 | 10 | | 10 |
| Styrene-butadiene-vinylpyridine latex (*3) | | | | | | | | 10 | |
| Crosslinking agent | Diphenylmethan-4,4'-bismaleimide | 50 | 50 | 50 | 50 | 50 | 50 | 50 | 50 |
| | P-quinonedioxime | | 10 | | | | | | |
| Crosslinking accelerator | Zinc dimethyl dithiocarbamate | | | 10 | | | | | 10 |
| | Zinc phosphate | | | | 10 | | | | |
| Carbon black | | | | | | 5 | | | 5 |
| Silica particles | | | | | | | 10 | | |
| Peroxide (cumen hydroperoxide) | | | | | | | | | 2 |
| Adhesive strength [N/10 mm] | | 35 | 45 | 50 | 50 | 40 | 37 | 35 | 60 |

(*1) Gohsenol GL-05 (produced by Chukyo Yushi Co., Ltd.)
(*2) Zetpol Latex (produced by Zeon Corp.)
(*3) Pyratex (produced by Nippon A & L Inc.)

TABLE 4

| Components | | Mass ratio of solid content (parts by mass) | | | | | | | |
|---|---|---|---|---|---|---|---|---|---|
| | | Ex. 25 | Ex. 26 | Ex. 27 | Ex. 28 | Ex. 29 | Ex. 30 | Ex. 31 | Ex. 32 |
| Polyvinyl alcohol (*1) | | 10 | 10 | 10 | 10 | 10 | 10 | 10 | 10 |
| Carboxyl-modified hydrogenated nitrile rubber latex (*2) | | | | | | | 10 | 10 | 10 |
| Styrene-butadiene-vinylpyridine latex (*3) | | 10 | 10 | 10 | 10 | 10 | | | |
| Crosslinking agent | Diphenylmethane-4,4'-bismaleimide | 50 | 50 | 50 | 50 | 50 | 50 | 90 | 20 |
| | P-quinonedioxime | | 10 | | | | | | |
| Crosslinking accelerator | Zinc dimethyl dithiocarbamate | | | 10 | | | 30 | 10 | 10 |
| | Zinc phosphate | | | | 10 | | | | |
| Resorcin-formaldehyde condensate | | 2 | 2 | 2 | 2 | 3 | | | |
| Adhesive strength [N/10 mm] | | 35 | 45 | 55 | 55 | 30 | 45 | 45 | 45 |

(*1) Gohsenol GL-05 (produced by Chukyo Yushi Co., Ltd.)
(*2) Zetpol Latex (produced by Zeon Corp.)
(*3) Pyratex (produced by Nippon A & L Inc.)

TABLE 5

| Components | | Mass ratio of solid content (parts by mass) | | | |
|---|---|---|---|---|---|
| | | Ex. 33 | Ex. 34 | Ex. 35 | Ex. 36 |
| Polyvinyl alcohol (*1) | | 10 | 10 | 10 | 10 |
| Carboxyl-modified hydrogenated nitrile rubber latex (*2) | | | 10 | | 10 |
| Styrene-butadiene-vinylpyridine latex (*3) | | 10 | | 10 | |
| Crosslinking agent | Diphenylmethane-4,4'-bismaleimide | 50 | 50 | 50 | 50 |
| | P-quinonedioxime | | | 10 | |
| Resorcin-formaldehyde condensate | | 2 | | 2 | |
| Adhesive strength [N/10 mm] | | 30 | 32 | 29 | 30 |

(*1) Gohsenol GL-05 (produced by Chukyo Yushi Co., Ltd.)
(*2) Zetpol Latex (produced by Zeon Corp.)
(*3) Pyratex (produced by Nippon A & L Inc.)

Comparative Examples 1 to 11

The rubber-reinforcing cords of Comparative Examples 1 to 11 were produced under the same conditions as in the Examples 1 to 16, except that the first treatment agents with the compositions shown in Tables 6 and 7 were used instead of the first treatment agents with the compositions shown in Tables 1 and 2. The first coating films of the rubber-reinforcing cords of the Comparative Examples 1 to 11 all had an adhesion rate of 20 mass %.

Comparative Examples 12 and 13

The first treatment agents shown in the Comparative Examples 4 and 9 each were applied to a sheet of woven nylon fibers, and dried at 120° C. for 1 minute to produce the rubber-reinforcing sheets of Comparative Examples 12 and 13. Table 8 shows the compositions of the first treatment agents used in the Comparative Examples 12 and 13. The first coating films of the rubber-reinforcing cords of the Comparative Examples 12 and 13 both had an adhesion rate of 10 mass %.

TABLE 6

| Components | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Polyvinyl alcohol (*1) | | | | | | | | | | 10 |
| Carboxyl-modified hydrogenated nitrile rubber latex (*2) | | 100 | | | | 100 | | 30 | | |
| Carboxyl-modified styrene-butadiene rubber latex (*4) | | | 30 | | 30 | | 30 | | 30 | |
| Styrene-butadiene-vinylpyridine latex (*3) | | | 70 | 100 | 70 | | 70 | 70 | 70 | 10 |
| Crosslinking agent (diphenylmethane-4,4'-bismaleimide) | | | | | 75 | | | | 75 | 50 |
| Crosslinking accelerator | Zinc dimethyl dithiocarbamate | | | | 15 | | | | 15 | |
| | Zinc phosphate | | | | | | | | | 10 |
| Resorcin-formaldehyde condensate | | | | | 1 | 1 | 1 | 1 | | 50 |
| Adhesive strength [N/10 mm] | | 5 | 5 | 5 | 10 | 10 | 5 | 10 | 10 | 20 |

(*1) Gohsenol GL-05 (produced by Chukyo Yushi Co., Ltd.)
(*2) Zetpol Latex (produced by Zeon Corp.)
(*3) Pyratex (produced by Nippon A & L Inc.)
(*4) Styrene-butadiene rubber latex (produced by Asahi Kasei Chemicals Corp.)

TABLE 7

| Components | Comp. Ex. 10 | Comp. Ex. 11 |
|---|---|---|
| Polyvinyl alcohol (*1) | 10 | 10 |
| Styrene-butadiene-vinylpyridine latex (*3) | 60 | 60 |
| Resorcin-formaldehyde condensate | | 2 |
| Adhesive strength [N/10 mm] | 5 | 5 |

(*1) Gohsenol GL-05 (produced by Chukyo Yushi Co., Ltd.)
(*3) Pyratex (produced by Nippon A & L Inc.)

TABLE 8

| Components | | Comp. Ex. 12 | Comp. Ex. 13 |
|---|---|---|---|
| Polyvinyl alcohol (*1) | | | 10 |
| Carboxyl-modified styrene-butadiene rubber latex (*4) | | 30 | |
| Styrene-butadiene-vinylpyridine latex (*3) | | 70 | 10 |
| Crosslinking agent (Diphenylmethane-4,4'-bismaleimide) | | 75 | 50 |
| Crosslinking accelerator | Zinc dimethyl dithiocarbamate | 15 | |
| | Zinc phosphate | | 10 |
| Resorcin-formaldehyde condensate | | | 50 |
| Adhesive strength [N/10 mm] | | 5 | 5 |

(*1) Gohsenol GL-05 (produced by Chukyo Yushi Co., Ltd.)
(*3) Pyratex (produced by Nippon A & L Inc.)
(*4) Styrene-butadiene rubber latex (produced by Asahi Kasei Chemicals Corp.)

The rubber-reinforcing cords of the Examples 1 to 32 and those of the Comparative Examples 1 to 11 were evaluated for adhesion to a rubber having the composition shown in Table 9 below. Each of the rubber-reinforcing cords was placed on a rubber sheet (10 mm in width×50 mm in length×5 mm in thickness) composed of the composition shown in Table 9 along a long side of the rubber sheet (so that the fiber direction of the rubber-reinforcing cord is almost parallel to the long side direction of the rubber sheet), and then heated at 190° C. for 15 minutes so that the rubber-reinforcing cord adheres to the rubber sheet. Thus, specimens were produced. Thereafter, the specimens were set on a tensile testing machine and pulled in the fiber direction of the rubber-reinforcing cord to measure the peel strength (adhesive strength) between the rubber sheet and the rubber-reinforcing cord. The results thereof are shown in Tables 1 to 4, 6, and 7.

The rubber-reinforcing sheets of the Examples 33 to 36 and the Comparative Examples 12 and 13 were evaluated for adhesion to the rubber having the composition shown in Table 9 below. Each of the rubber-reinforcing sheets was placed on a rubber sheet (10 mm in width×50 mm in length×5 mm in thickness) composed of the composition shown in Table 9, and then heated at 190° C. for 15 minutes so that the rubber-reinforcing sheet adheres to the rubber sheet. Thus, specimens were produced. Thereafter, the specimens were set on the tensile testing machine and pulled in the long side direction of the rubber sheet to measure the peel strength (adhesive strength) between the rubber sheet and the rubber-reinforcing sheet. The results thereof are shown in Tables 5 and 8.

TABLE 9

| Components | Mass ratio |
|---|---|
| Ethylene-propylene-diene copolymer rubber (*5) | 100 |
| Zinc oxide | 5 |
| Stearic acid | 1 |
| Carbon black (*6) | 50 |
| Silica (*7) | 20 |
| Paraffin oil (*8) | 20 |
| Dicumyl peroxide | 1 |
| Sulfur | 2 |
| Mixed crosslinking accelerator (*9) | 2.8 |

TABLE 9-continued

| Components | Mass ratio |
|---|---|
| N-oxydiethylene-2-benzothiazyl sulfenamide (MSA) | 1.2 |
| 2,2,4-trimethyl-1,2-dihydroquinoline (TMDQ) | 2 |
| 2-mercaptobenzimidazole (MB) | 1 |
| Tackifier (*10) | 5 |

(*5) Ethylidene norbornene 4 wt %
(*6) HAF (produced by Mitsubishi Chemical Corp.)
(*7) Tokusil Gu (produced by Tokuyama Corp.)
(*8) Sunflex 2280 (made by Japan Sun Kagaku KK)
(*9) EP-150: dibenzo thia disulfide (DM), tetramethylthiuramdisulfide (TT), and zinc diethyldithiocarbamate (EZ) (produced by Ouchi Shinko Chemical Industrial Co., Ltd.)
(*10) Petroleum resin Quinton A-100 (produced by Zeon Corp.)

As shown in Tables 1 to 8, the adhesive strengths were higher in the Examples than in the Comparative Examples. More specifically, higher adhesive strengths were obtained in the Examples 1 to 36, in which the treatment agents (the first treatment agents in the present invention) containing the polyvinyl alcohol and the crosslinking agent were used, than in the Comparative Examples 1 to 8 and 10 to 12, in which these treatment agents were not used. In the Comparative Examples 9 and 13, the polyvinyl alcohol and the crosslinking agent were used, but a high adhesive strength was not obtained due to the high content of the resorcin-formaldehyde condensate. In the Comparative Examples 4, 8, and 12, the crosslinking agent was used, but a high adhesive strength was not obtained because the polyvinyl alcohol was not used. In the Comparative Examples 10 and 11, the polyvinyl alcohol was used, but a high adhesive strength was not obtained because the crosslinking agent was not used. A higher adhesive strength was obtained when the zinc-compound crosslinking accelerator was used (the Examples 3, 4, 8, 11, 12, 14, 15, 16, 19, 20, 24, 27, 28, 30, 31, and 32). When comparisons are made between the case where the treatment agent of the Example 3 was used and the case (the Example 15) where the treatment agent having a higher content of the crosslinking agent than that in the Example 3 was used, and between the case where the treatment agent of the Example 3 was used and the case (the Example 16) where the treatment agent having a lower content of the crosslinking agent than that in the Example 3 was used, the adhesive strength is higher in the case where the treatment agent of the Example 3 was used in both comparisons. When comparisons are made between the case where the treatment agent of the Example 3 was used and the case (the Example 14) where the treatment agent having a higher content of the crosslinking accelerator than that in the Example 3 was used, and between the case where the treatment agent of the Example 3 was used and the case (the Example 1) where the treatment agent free from the crosslinking accelerator was used, the adhesive strength is higher in the case where the treatment agent of the Example 3 was used in both comparisons. Likewise, when comparisons are made between the case where the treatment agent of the Example 19 was used and the case (the Example 31) where the treatment agent having a higher content of the crosslinking agent than that in the Example 19 was used, and between the case where the treatment agent of the Example 19 was used and the case (the Example 32) where the treatment agent having a lower content of the crosslinking agent than that in the Example 19 was used, the adhesive strength is higher in the case where the treatment agent of the Example 19 was used in both comparisons. When comparisons are made between the case where the treatment agent of the Example 19 was used and the case (the Example 30) where the treatment agent having a higher content of the crosslinking accelerator than that in the Example 19 was used, and between the case where the treatment agent of the Example 19 was used and the case (the Example 17) where the treatment agent free from the crosslinking accelerator was used, the adhesive strength is higher in the case where the treatment agent of the Example 19 was used in both comparisons.

While embodiments of the present invention have been illustrated referring to the examples thereof, it should be understood that the present invention is not limited to the embodiments described above, and may be applied to various other embodiments based on the technical idea of the present invention.

Industrial Applicability

The rubber-reinforcing member of the present invention can attain satisfactory adhesion to rubber, and thereby can be used to reinforce various rubber products. The rubber-reinforcing member of the present invention also can be utilized suitably as a rubber-reinforcing cord for a timing belt, etc. required to have a high heat resistance and a high bending fatigue resistance. Moreover, since the rubber product of the present invention can withstand a heavy load, it is applicable to various applications.

The invention claimed is:

1. A rubber-reinforcing member for reinforcing a rubber product, comprising:
   a reinforcing fiber or a reinforcing fiber sheet;
   a first coating film; and
   a second coating film,
   wherein the first coating film is formed by applying an aqueous first treatment agent onto the second coating film and drying the first treatment agent,
   the first treatment agent comprises:
      polyvinyl alcohol;
      at least one agent selected from the group consisting of a maleimide crosslinking agent and a quinonedioxime crosslinking agent; and
      a crosslinking accelerator comprising a zinc compound, as essential components; and
      a resorcin-formaldehyde condensate as an optional component,
   a content of the resorcin-formaldehyde condensate in the first treatment agent is from 0 to 40 parts by mass relative to 10 parts by mass of the polyvinyl alcohol, in terms of mass ratio of solid content,
   a mass ratio among the polyvinyl alcohol, the crosslinking agent, and the crosslinking accelerator in the first treatment agent is from 20 to 90 parts by mass of the crosslinking agent and from 10 to 30 parts by mass of the crosslinking accelerator, relative to 10 parts by mass of the polyvinyl alcohol, and
   the second coating film is formed by applying a second treatment agent comprising a rubber latex to a surface of the reinforcing fiber or a surface of the reinforcing fiber sheet and drying the second treatment agent.

2. The rubber-reinforcing member according to claim 1, wherein the content of the resorcin-formaldehyde condensate in the first treatment agent is from 0 to 2 parts by mass relative to 10 parts by mass of the polyvinyl alcohol, in terms of a mass ratio of a solid content.

3. The rubber-reinforcing member according to claim 2, wherein the first treatment agent is free from the resorcin-formaldehyde condensate.

4. The rubber-reinforcing member according to claim 1, wherein the first treatment agent further comprises a rubber latex.

5. The rubber-reinforcing member according to claim 1, wherein the first treatment agent further comprises carbon black.

6. The rubber-reinforcing member according to claim 1, wherein the first treatment agent further comprises silica particles.

7. The rubber-reinforcing member according to claim 1, wherein the second treatment agent further comprises the resorcin-formaldehyde condensate.

8. A rubber product comprising the rubber-reinforcing member according to claim 1.

* * * * *

UNITED STATES PATENT AND TRADEMARK OFFICE
CERTIFICATE OF CORRECTION

PATENT NO. : 8,962,129 B2  
APPLICATION NO. : 12/600044  
DATED : February 24, 2015  
INVENTOR(S) : Tai et al.

Page 1 of 1

It is certified that error appears in the above-identified patent and that said Letters Patent is hereby corrected as shown below:

On the title page item 56, column 2, under "Foreign Patent Documents", line 2, delete "EP 1 842 958 A1 10/2007"

Signed and Sealed this  
Twenty-seventh Day of October, 2015

Michelle K. Lee  
*Director of the United States Patent and Trademark Office*